(12) United States Patent
White

(10) Patent No.: US 6,910,736 B2
(45) Date of Patent: Jun. 28, 2005

(54) SEATS WITH TWISTABLE SEAT ELEMENTS

(75) Inventor: Adam White, London (GB)

(73) Assignee: Factory Design Limited, London (GB)

( * ) Notice: Subject to any disclaimer, the term of this patent is extended or adjusted under 35 U.S.C. 154(b) by 0 days.

(21) Appl. No.: 10/480,686

(22) PCT Filed: Jun. 14, 2002

(86) PCT No.: PCT/GB02/02680
§ 371 (c)(1),
(2), (4) Date: Dec. 8, 2003

(87) PCT Pub. No.: WO02/102203
PCT Pub. Date: Dec. 27, 2002

(65) Prior Publication Data
US 2004/0195882 A1 Oct. 7, 2004

(30) Foreign Application Priority Data
Jun. 14, 2001 (GB) .............................. 0114581

(51) Int. Cl.⁷ .......................... A47C 7/14; A47C 3/025; B60N 2/02
(52) U.S. Cl. ................. 297/284.3; 297/284.1; 297/312; 297/314; 297/452.63
(58) Field of Search ............................ 297/284.3, 284.1, 297/284.2, 284.4, 284.7, 284.8, 312, 314, 452.63

(56) References Cited

U.S. PATENT DOCUMENTS 2,139,028 A * 12/1938 Mensendicck et al. ... 297/284.1
2,799,323 A * 7/1957 Berg ........................... 297/312
3,080,195 A * 3/1963 Berg ........................... 297/312
3,112,137 A * 11/1963 Drenth ..................... 297/284.3
3,554,599 A * 1/1971 Pietschmann ........ 297/284.3 X
3,565,482 A * 2/1971 Blodee ..................... 297/284.3
5,024,485 A * 6/1991 Berg et al. .................. 297/312
5,288,127 A * 2/1994 Berg et al. .................. 297/312
5,328,245 A * 7/1994 Marks et al. ............. 297/284.3
5,553,919 A * 9/1996 Dennis .................... 297/284.8
5,558,398 A * 9/1996 Santos ..................... 297/284.3
5,769,492 A * 6/1998 Jensen ........................ 297/314
5,975,641 A * 11/1999 Delesie .................. 297/452.63

FOREIGN PATENT DOCUMENTS

EP  141652 A1 * 5/1985 .............. 297/284.3

* cited by examiner

Primary Examiner—Rodney B. White
(74) Attorney, Agent, or Firm—Herbert Dubno

(57) ABSTRACT

The invention relates to a seat or seat back comprising of seat elements which are arranged to resiliently move with respect to each other and arranged to move with respect to a central axis, running centrally through the seat or seat back parallel to the spine of the occupant in a normally seated position, the first and second seat elements moving in opposite directions on either side of the central axis. The seat elements may rotate and are subject to a restoring force urging them to return them to their rest positions such that the user is able to move in a twisting position and the seat back or seat will also twist with the twisting movement of the user and provide support in the newly adopted position of the user. The seat elements could be formed from a single piece of resilient material.

8 Claims, 12 Drawing Sheets

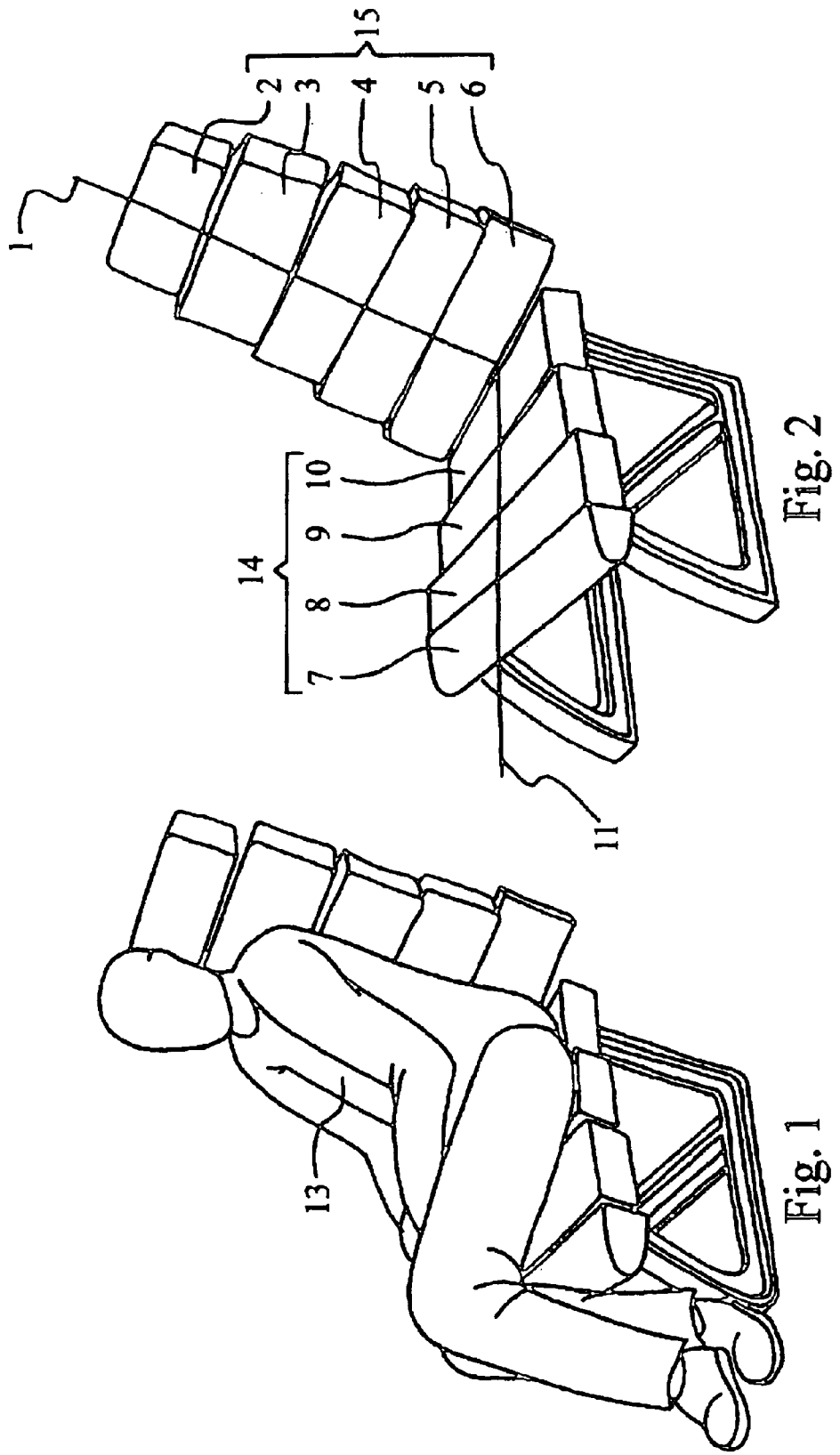

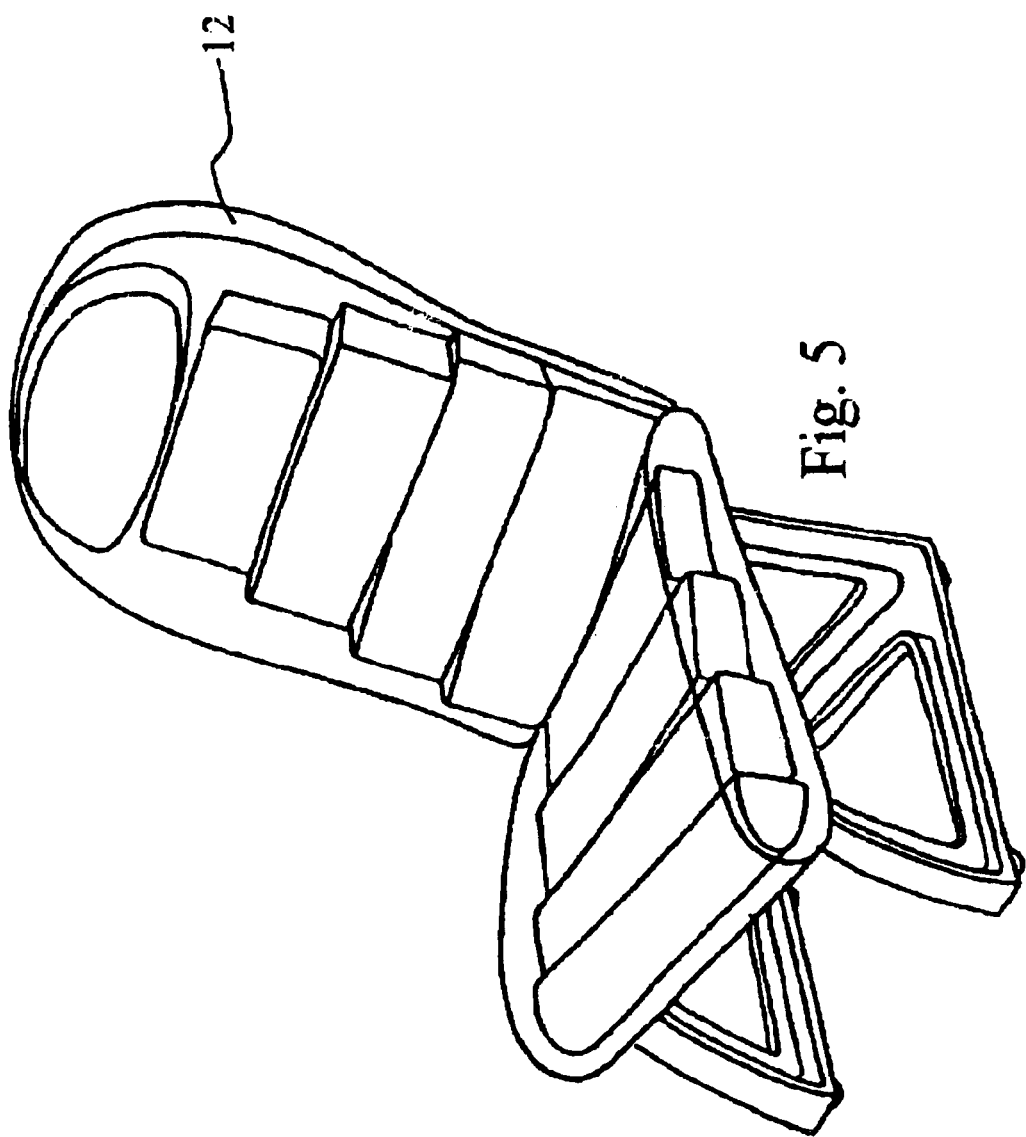

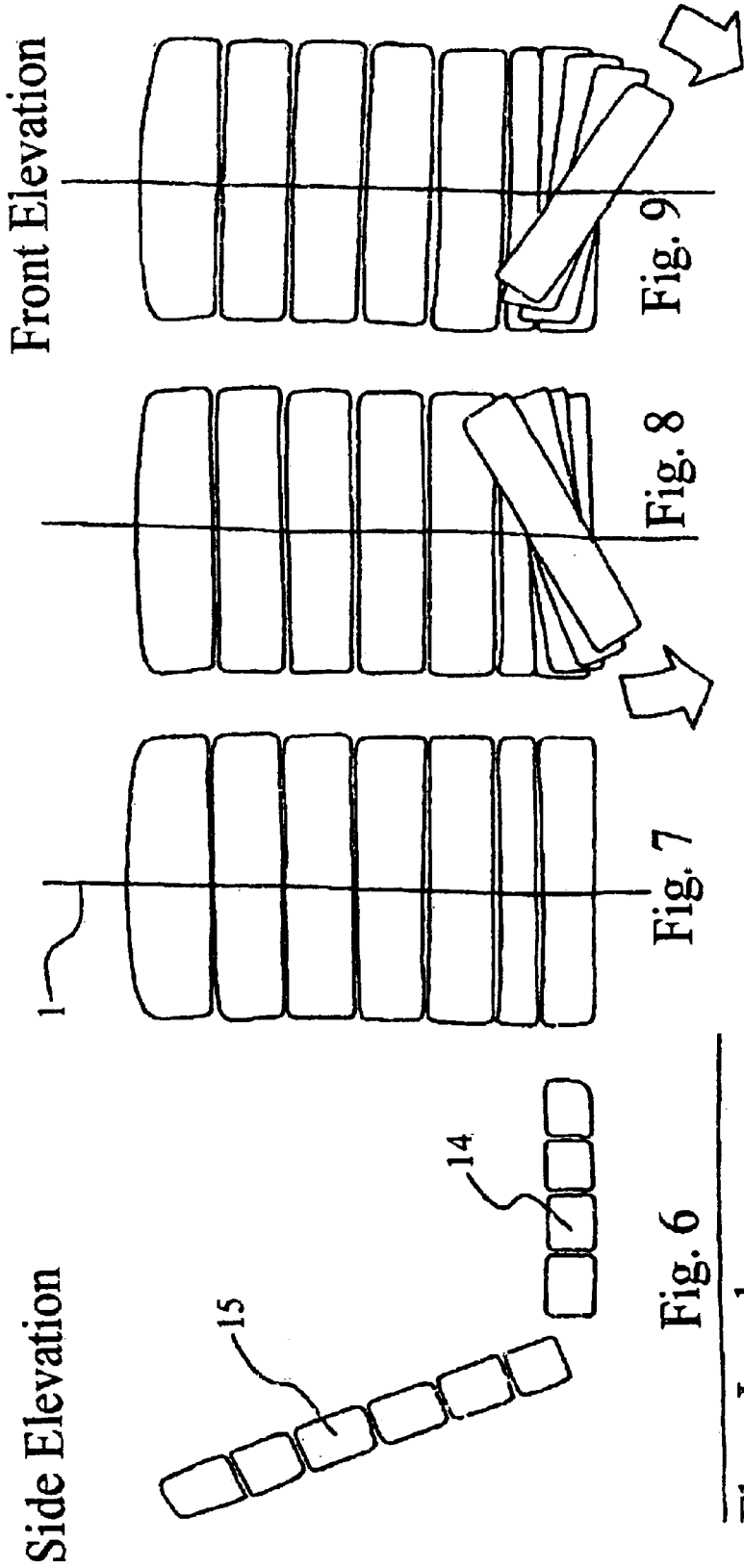

Plan

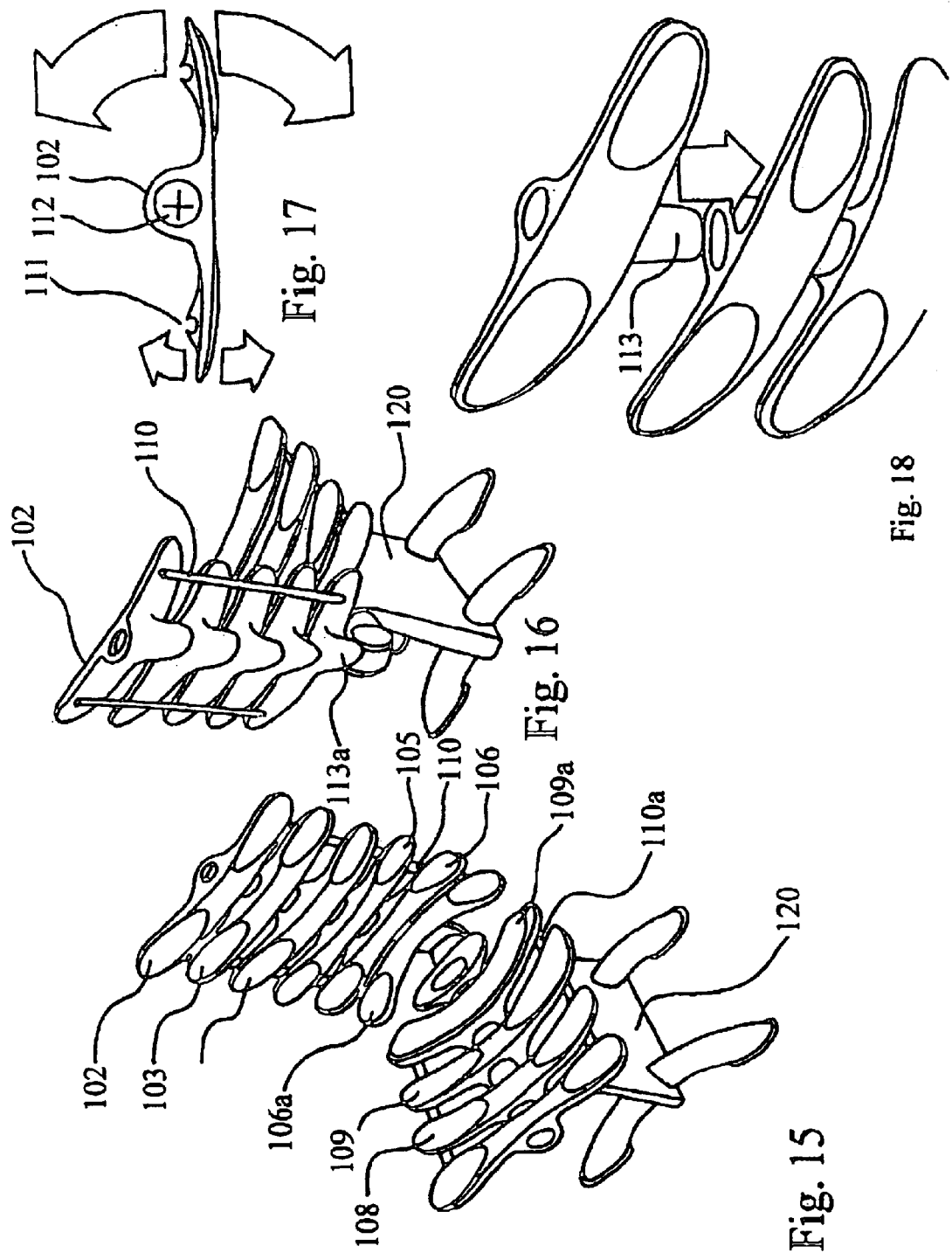

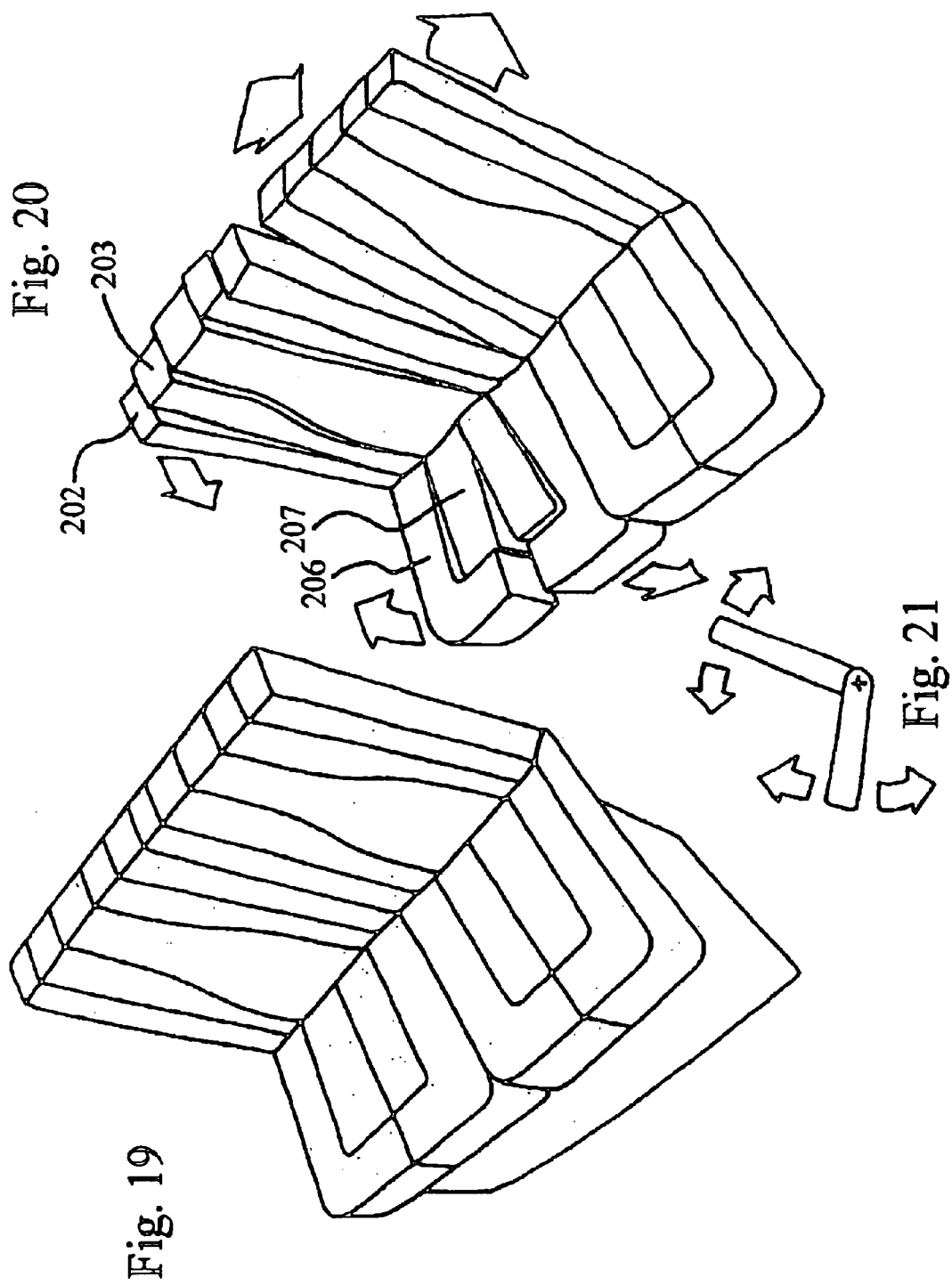

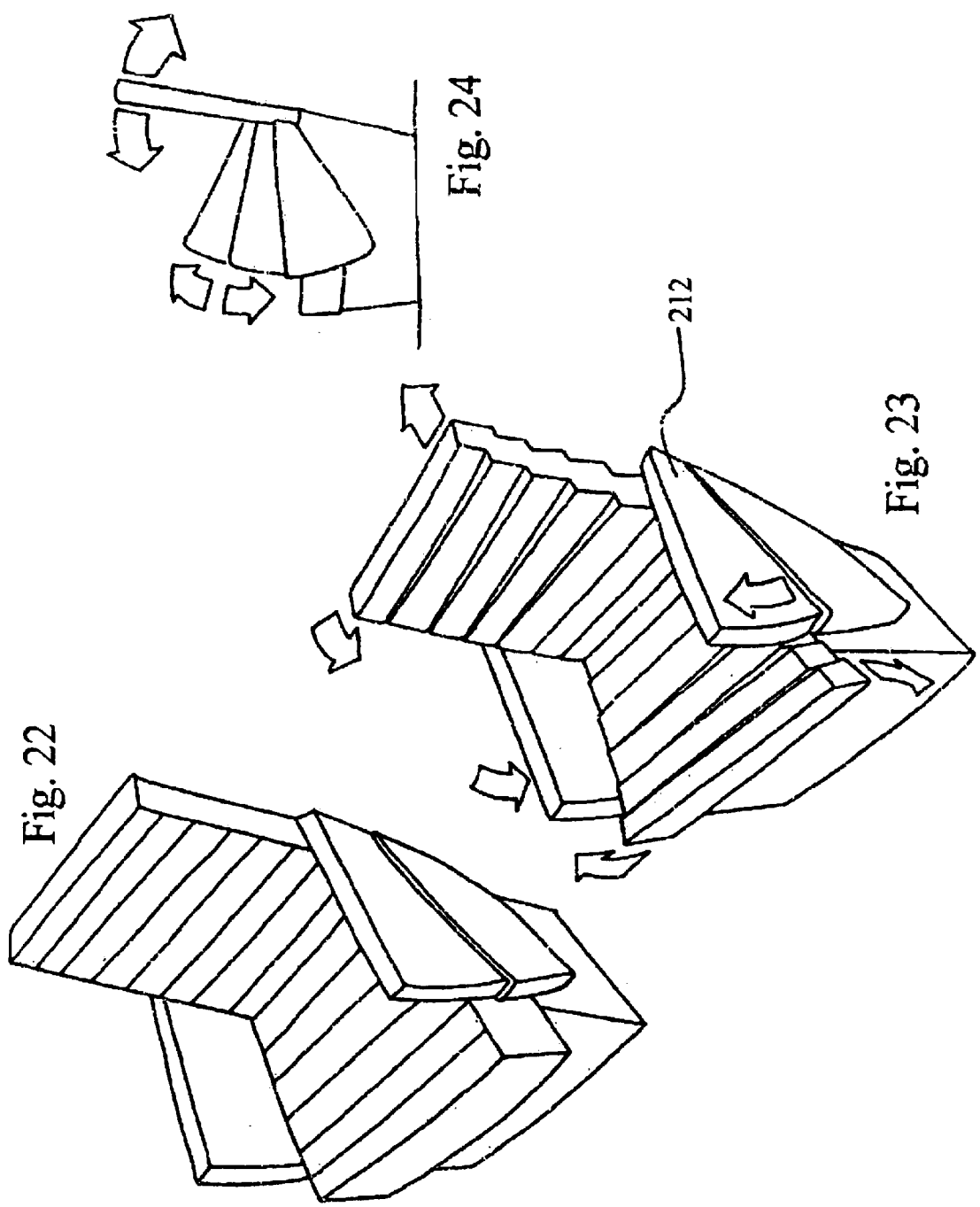

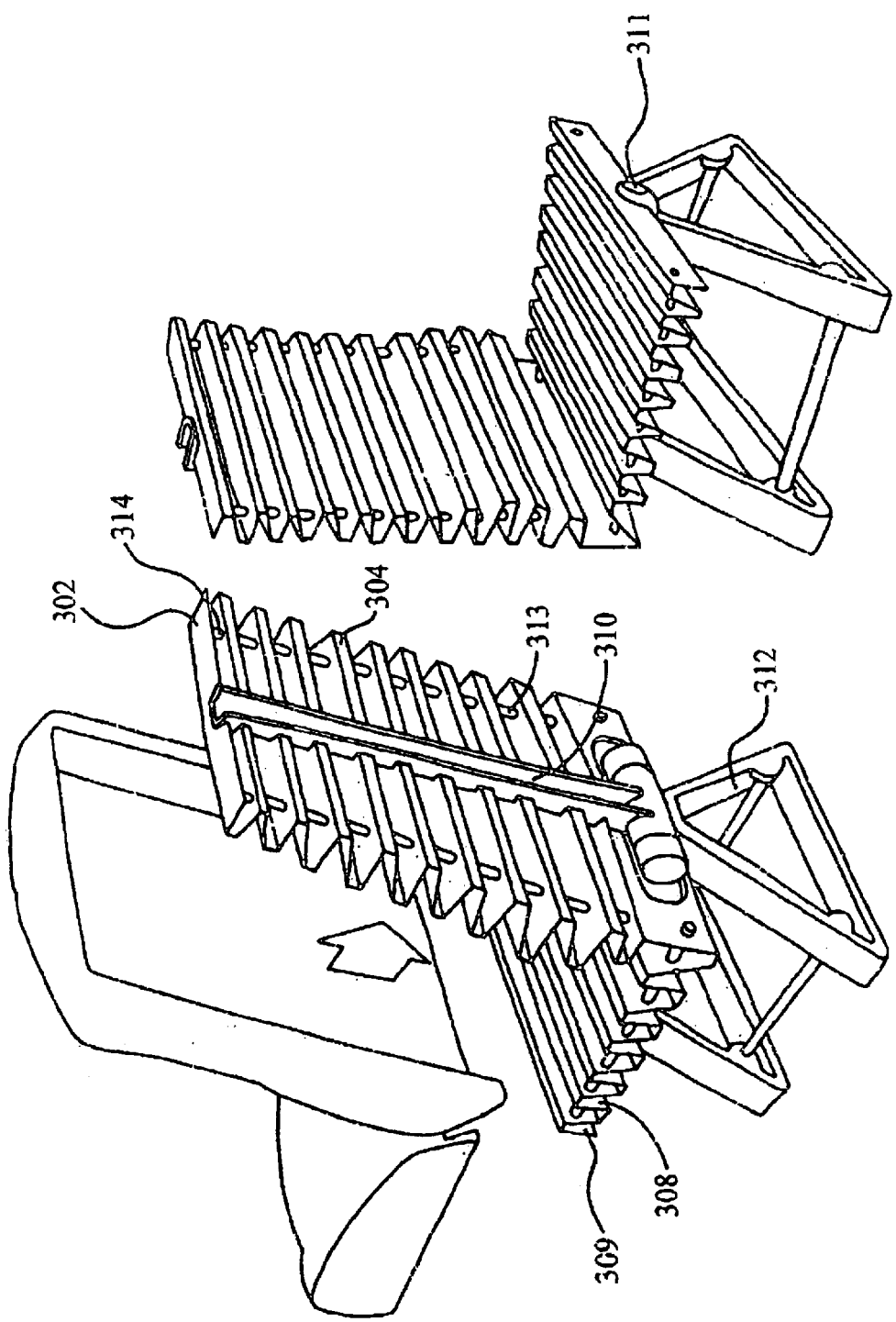

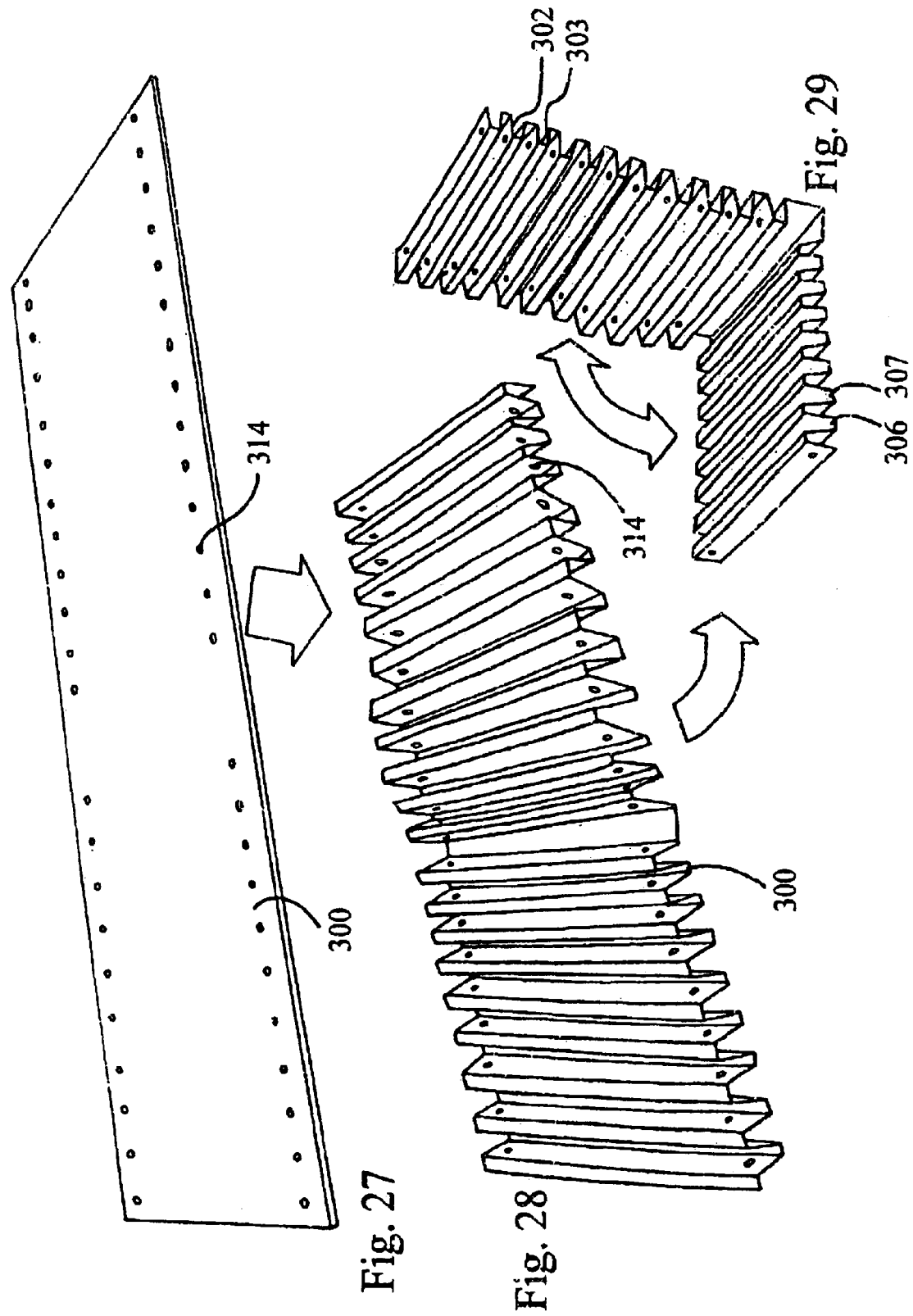

SEATS WITH TWISTABLE SEAT ELEMENTS

CROSS REFERENCE TO RELATED APPLICATIONS

This application is a national stage of PCT application PCT/GB02/02680 filed 14 Jun. 2002 and based upon the national application GB 0114581.2 of 14 Jun. 2001 under the International Convention.

FIELD OF THE INVENTION

This invention relates to a seat or chair having means of adjustment in order to accommodate the movement and seating positions of the user particularly with a view to providing a more comfortable and healthy seat for sitting for long periods.

BACKGROUND OF THE INVENTION

Such seats may be used for example for seating in airliners, trains or coaches where users are required to sit during long journeys, but the invention may also be useful for all types of seating, for example for cinemas and theaters, office seats, and all types of seating in general.

Adjustable seats are well known. They can have means to adjust the inclination of the seat back and or the seat so the user is more or less inclined according to the choice of the user. In addition there are also existing seats with means for adjusting the angle of inclination of different parts of the seat back such as the lumbar part, middle part or head rest part to fit the desired inclination of the particular users back.

Nevertheless seats with these known reclining adjustments still lead to complaints of discomfort as well as recently discovered health problems associated with sitting for long periods, such as deep vein thrombosis.

OBJECT OF THE INVENTION

The invention has as its objective the provision of an improved seat means.

SUMMARY OF THE INVENTION

According to the invention there is provided a seat or seat back comprising at least first and second seat elements which are arranged to resiliently move with respect to each other, characterized in that at least first and second seat elements are arranged to move with respect to a central axis running centrally through the seat or seat back parallel to the spine of the occupant in a normally seated position (spinal axis), the first and second seat elements moving in opposite directions on either side of the central axis.

Preferably the at least one seat element is rotatably movable with respect to the central axis with at least one pair of seat elements arranged on either side of the central axis.

Preferably the seat elements are subject to a restoring force urging them to return them to their rest positions. Thus the user is able to move in a twisting position and the seat back or seat will also twist with the twisting movement of the user and provide support in the newly adopted twisted position of the user.

The restoring force on the seat elements may be provided by an elongate spring member movably fixed to each of the seat elements on either side of the central axis.

The seat elements may be formed by separately formed seat parts each arranged on a central support member. Alternatively the seat elements can be made in a single piece by forming corrugations in a sheet-like member.

According to a further aspect of the invention a seat or seat back is provided comprising a support frame and a seat element which are arranged to resiliently move in response to the posture of the occupant, characterized in that the seat element is arranged to resiliently move with respect to a central axis, running centrally through the seat or seat back parallel to the spine of the occupant in a normally seated position, the respective parts of the seat element on either side of the central axis moving in opposite directions on either side of the central axis.

One of the main advantages of the seat of the invention is that it enables the occupant to assume a variety of different postures which are achieved by the longitudinal twisting of the seat elements along the central longitudinal axis of the seat or seat back.

A farther main advantage of the seat or seat back of the invention is that it enables the occupant to carry out a repeated series of movements which might constitute a simple form of physical exercise while remaining seated.

BRIEF DESCRIPTION OF THE DRAWING

Embodiments of the invention will now be described with reference to the drawing in which:

FIG. 1 is a perspective side view of a seat of a first embodiment of the invention with the occupant the seated therein, FIG. 2 is a perspective view of the seat of FIG. 1 without the occupant seated therein, FIG. 5 is a perspective view which shows the seat of FIG. 1 with the upholstery layer affixed thereto, FIG. 6 is a side elevation of the seat of FIG. 1, FIG. 7 is a front elevation of the seat of FIG. 1, FIG. 8 shows the view of FIG. 7 with the occupant in a first alternative position, FIG. 9 shows the view of FIG. 7 with the occupant in a second alternative position, FIG. 15 is a perspective view which shows an alternative embodiment of a single seat, FIG. 16 is a rear perspective of the seat of FIG. 15, FIG. 17 is a top view of a single seat element of the seat of FIG. 15, FIG. 18 is a view of the seat back of the seat in FIG. 15 during assembly, FIG. 19 is a perspective view of a further embodiment of a double seat according to the invention, FIG. 20 is a view of the seat of FIG. 19 in an adopted position, FIG. 21 is a schematic view of the seat of FIG. 19, FIG. 22 is a perspective view of a single seat according to a further embodiment of the invention, FIG. 23 is a perspective view of the seat of FIG. 22 in an adopted position, FIG. 24 is a schematic view of the seat of FIG. 22, FIGS. 25 to 29 are perspective views which show an alternative embodiment of a seat of the invention in which the seat is formed from a single sheet of material.

SPECIFIC DESCRIPTION

Figure 4:
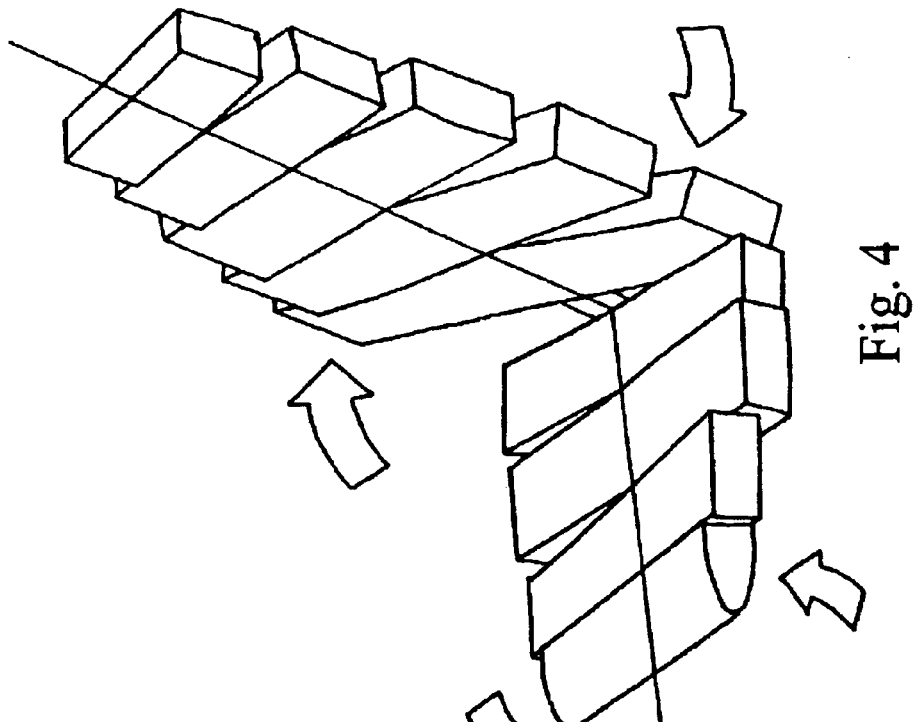
FIG. 4 is a perspective view which shows the seat of FIG. 1 with the occupant in a further alternative position (occupant not shown)

FIG. 1 shows a seat according to a first embodiment with the occupant adopting a twisted posture. The seat supports the body in this twisted position by means of the twisting movement of the seat back elements 2, 3, 4, 5, 6 and seat elements 7, 8, 9, 10 as shown in FIG. 2. It can be seen from FIG. 2 that the seat 14 and the seat back 15 effectively twist about their respective axes 11, 1. Each seat back element 2, 3, 4, 5, 6 is able to rotate independently about the seat back axis 1. Each seat element 7, 8, 9 10 is able to rotate independently about the seat axis 11. A restoring force is provided to each element to control the movement in response to the positioning of the occupant in order that adequate support is provided in the chosen position. In this embodiment this is provided by pneumatic or hydraulic means for example in the form of a pneumatic or hydraulic bladder arranged behind each element to provide a suitable restoring force.

Figure 3:
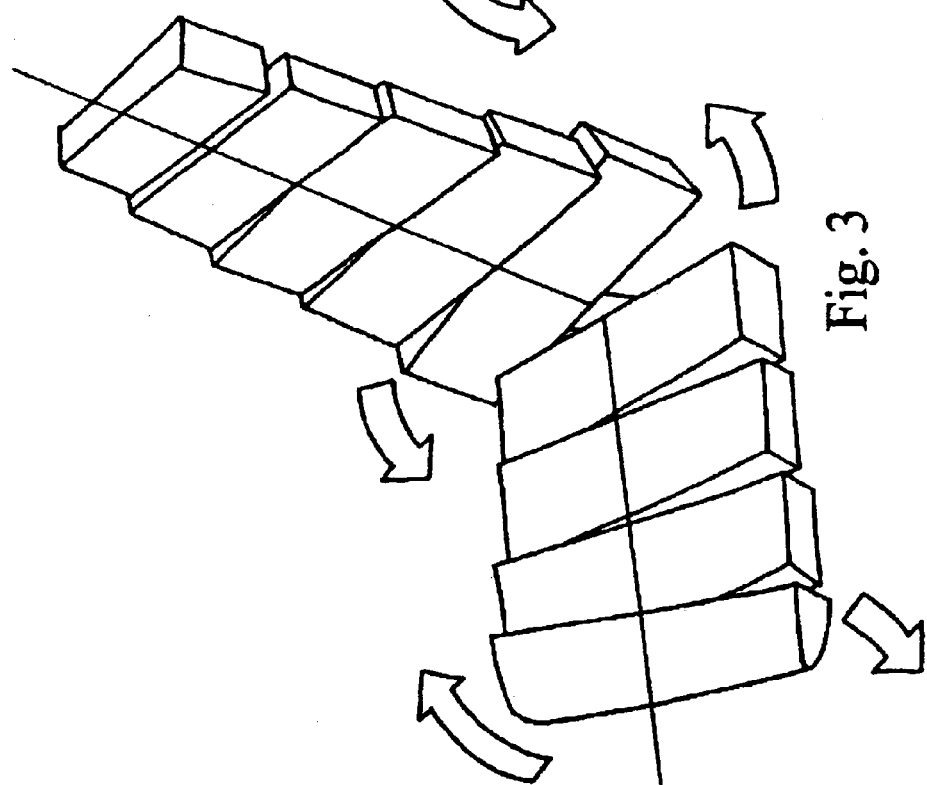
FIG. 3 is a perspective view which shows the seat of FIG. 1 with the occupant in an alternative position (occupant not shown)
Figure 10:
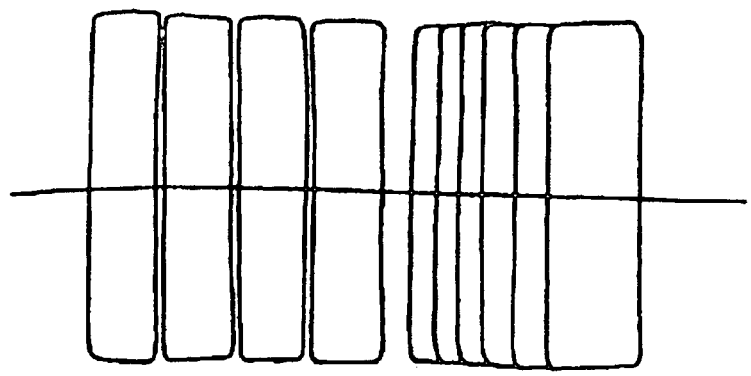
FIG. 10 is a plan of the seat of FIG. 1.
Figure 11:
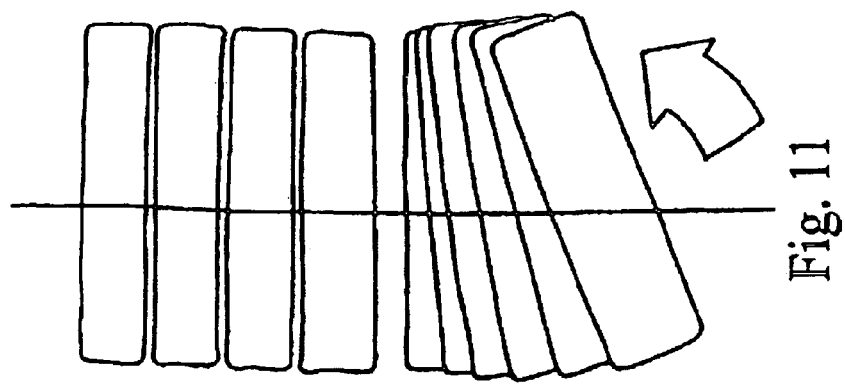
FIG. 11 shows the view of FIG. 10 with the occupant in a first alternative position.
Figure 12:
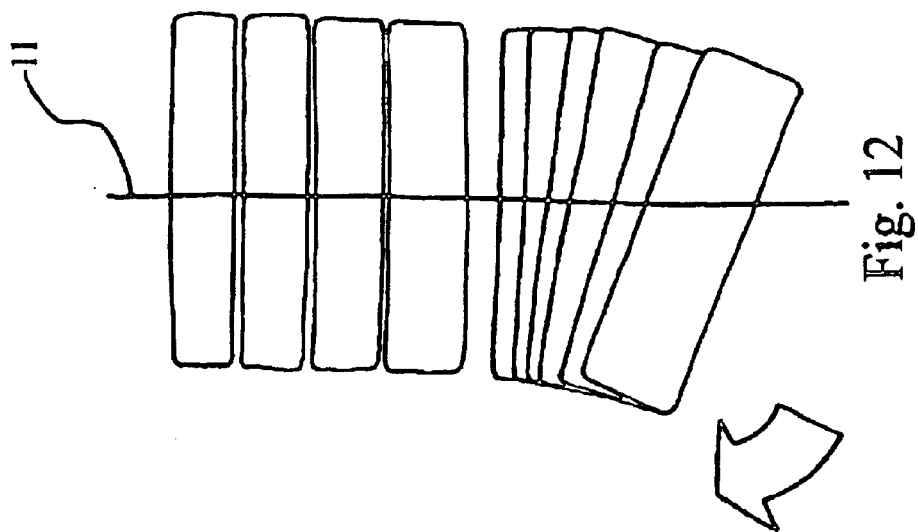
FIG. 12 shows the view of FIG. 10 with the occupant in a second alternative position.

FIG. 3 shows the seat elements in a similar orientation to FIG. 2 with the occupant in a posture twisted towards the viewer with corresponding front elevation and topside view in FIGS. 9 and 11 respectively. FIGS. 4, 8 and 12 show the seat and seat back elements in positions responding to an occupant in a posture twisted away from the viewer. In each case the movement of the elements is controlled so that the movement does not extend beyond what is comfortable.

The seat responds to the twisting movement of the occupant. A large part of this twisting movement is movement of the occupants body rotationally about the spine of the occupant. The seat of the invention accommodates this rotational movement about the spine by the seat elements correspondingly rotating about a central axis which corresponds to the spine of the user and runs through the center of the seat back adjacent to the occupant's spine. This central axis also continues into the plane of the seat and through the center of the seat corresponding to the centerline between the users legs in an upright seating position.

As well as accommodating the twisting movement of the occupant, the seat accommodates a range of different postures of the occupant and provides support and reduces pressure in these different positions. For example, from the normal straight seating position with the legs bent at the knees at approximately 90 degrees at the front edge of the seat, the occupant may wish to extend one leg to straighten it for a while. With a normal seat this straightening creates pressure between the users legs and the front edge of the seat. No amount of cushioning can eliminate this increase in pressure and furthermore the pressure is concentrated on what is effectively line contact between the users leg and the front edge of the seat. In a well cushioned seat this line may well be quite broad, but in a not so well cushioned seat this line could be quite a narrow one. This pressure is usually exaggerated by a slight unconscious twisting of the body which causes more of the occupants weight to bear down through the straightened leg and through the line of contact with the front edge of the seat. Correspondingly, in a normal seat the other leg will experience less contact pressure with the seat. With the seat of the invention on the other hand, the side of the seat on which the extended leg rests will drop by a small significant extent, so that the angle between the plane of the seat and the plane of the straightened leg is much less than for a normal seat. The pressure and the line of contact between the leg and the front edge of the seat is therefore much reduced and the line of contact is made much broader. Correspondingly the other side of the seat will rise and provide more even contact pressure to the unstraightened leg. In this way the pressure points on the occupant's body are reduced and the occupant is more comfortable in different positions and is also less prone to health problems which are reportedly related to sustained pressure points on critical parts of the occupants body.

FIG. 5 shows that the seat and seat back elements are preferably covered by a single cover sheet 12 so the appearance of the seat can be varied without effecting the mechanism or its functions. Multiple cover-pieces may be used.

Tin occupant may optionally choose to release the mechanism for either the seat or seat back or both from a "posture locked" status. When released each element will rotate to accommodate the adopted position of the occupant and improve the comfort or alternatively to offer a greater variety of sitting configurations or provide a means for an exercise routine or any combination of these.

Figure 14:
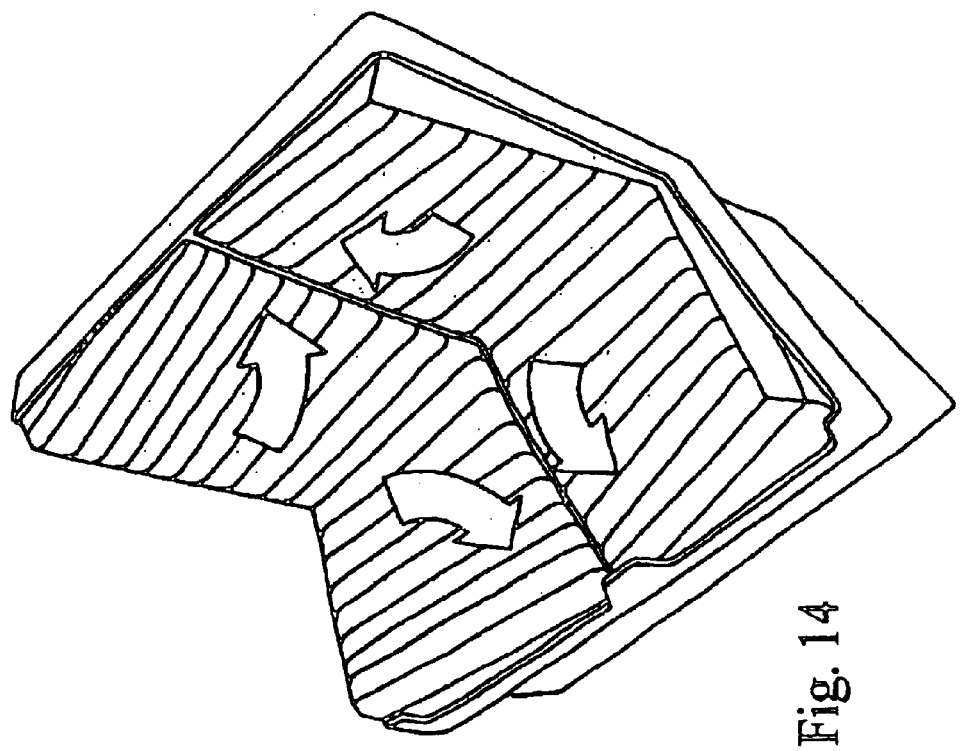
FIG. 14 is a perspective view which shows the seat of FIG. 13 in an adopted position.
Figure 13:
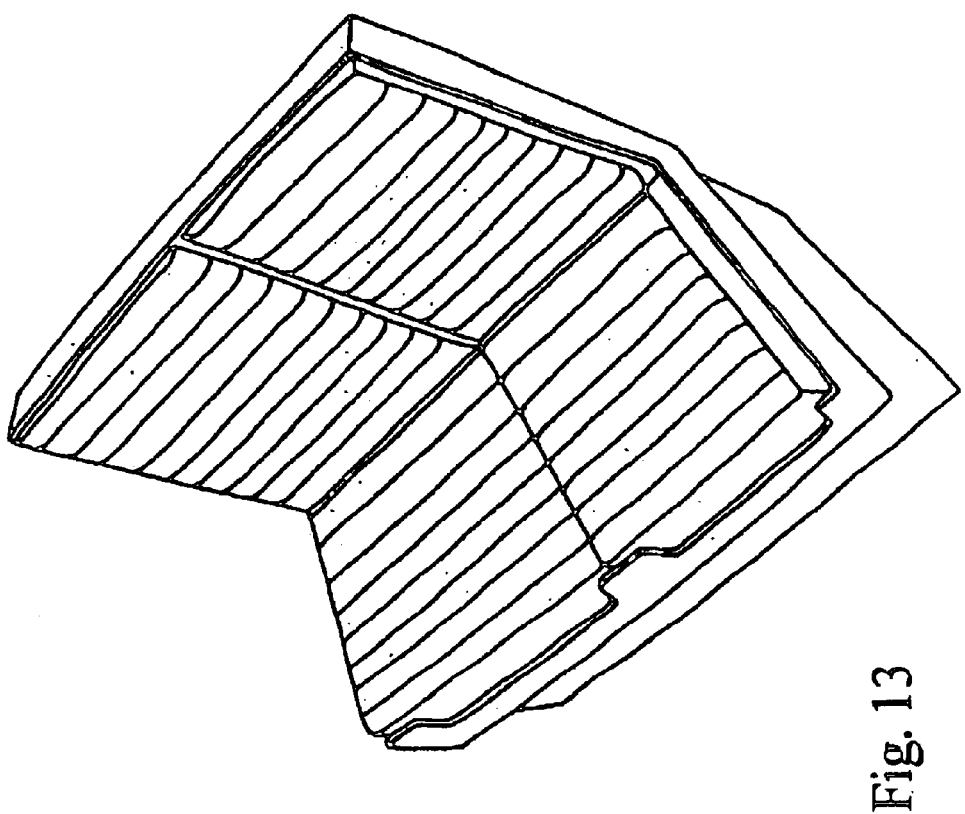
FIG. 13 is a perspective view of an alternative embodiment of a pair of seats each individually adjustable about a central vertical axis.

FIG. 13 shows an alternative embodiment of a pair of seats each individually adjustable about a central vertical axis. FIG. 13 shows the seats in an unadjusted position with the seat elements at rest. In FIG. 14 the seat elements are in adjusted positions in response to the postures of the occupants, (in this figure) with the occupants in postures facing each other. In this embodiment the seat elements are connected together so that they move as a single part. This may be achieved by the use of a seat covering over separately movable seat elements or alternatively it may be achieved by a single flexible piece, which is itself resiliently flexible in response to the movement of the user.

FIGS. 15 to 18 show an alternative embodiment of a single seat and shows how the seat elements 102 to 109 are rotatably connected together in an alternative way. Instead of a central support member in the earlier embodiment the seat elements 102–109 have corresponding male and female inter-fitting parts 113, 112 which permit the respective relative rotatable movement of the seat elements. These correcting parts 112, 113 effectively form a central support for the occupant. The lowermost connect part 113a of the seat back is fixedly connected to the support frame 120. Similarly the rear most connecting part 113 of the seat is fixedly connected to the support frame 120. Additional connecting parts 113 may be corrected to the support frame 120 either in a fixed manner or in a manner allowing rotational movement.

Stiff elastically resilient strips 110 are connected on each side of the central support to each of the seat back seat elements 102–106a at connecting means 111 on each seat element. These stiff elastically resilient strips provide the restoring force to the rest position which will provide the resilient support in the adopted twisted position. Similarly two stiff elastically resilient strips 110a are provided for the seat seat element. In order to provide the required support for the seat and seat back seat elements the inner most seat seat element 109a and the lowermost seat back seat element 106a may be fixed to the frame. The resilient strips 110, 110a are therefore rigidly secured at one end and the remaining seat elements are able to twist about this fixed point. The resilient strips 110, 110a may alternatively pass through the lowermost seat back element and the rearmost seat seal element by means of the connection means 111 in common with the other seat elements and be anchored directly to the fixed frame 120 at a suitable point so that the twisting movement is permitted by all the seat element about a region on the frame 120 where the seat back and seat come together. It will be appreciated as a further alternative a central seat element could be fixed, such as seat seat elements 108, 109 or seat back seat elements 104, 105, and the resilient strips 110, 110a fixed to that corresponding seat element so that the twisting movement of the seat element occurs on either side of the fixed seat element instead of from the region where the seat back and seat come together. In this way the extent and nature of the available twisting movement can be designed to suit the particular desired properties of the seat according to the seat type, that is whether it is an airline seat, a coach seat, a theater seat etc.

FIGS. 19 to 21 show a further embodiment of a double seat according to the invention. In this embodiment the seat elements 202 to 207 do not rotate with respect to the central axis but instead move inwardly and outwardly with respect to the central axis. This inwards and outwards movement is best shown in FIG. 20 in which the movement takes place by inclination about an axis at the join of the seat and seat back but with the element moving independently on either side of the central axis of the seat and seat back.

In FIGS. 22 to 24 a further embodiment is shown of a single seat which has posture adjustment by movement of seat elements about the central axis. In this embodiment the seat additionally has arm supports 212 which are also resiliently movable and move in response to the posture adopted by the user.

FIGS. 25 to 29 show an alternative embodiment of a seat of the invention in which the seat elements 302–309 are formed from the corrugations of a single sheet of material 300. The dimensions of the corrugations are not uniform but are dimensioned individually to correspond to the desired shaped of the final seat. The gauge and structural mechanical properties of the sheet are chosen so that the corrugations flex and move when subject to the movement of the occupant in the seat. The sheet 300 is rotatably supported on central support elements 310, 311 which is connected to a support frame 312. Resilient rods 313 are arranged on each side of the central support member and pass through holes 314 in each of the seat elements.

Such a seat can be made relatively easily and cheaply and produce a seat of lightweight construction which will be beneficial in a number of applications. Referring to FIGS. 27 to 29 a single sheet 300 is firstly perforated with through holes 314 before being bent to form corrugations in a desired form as shown in FIG. 28. Finally the sheet is secured to the central support members 310, 311 in the seat position and the resilient rods 313 are fitted through the holes 314.

Figure 31:
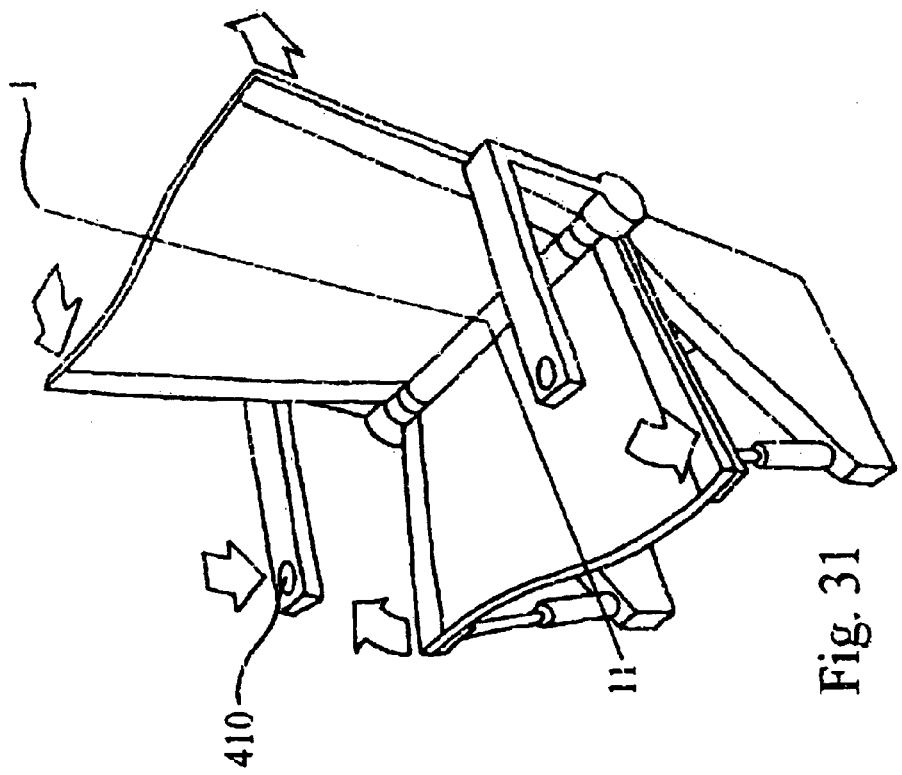
FIGS. 30 and 31 are perspective views which show a further embodiment of the invention.
Figure 30:
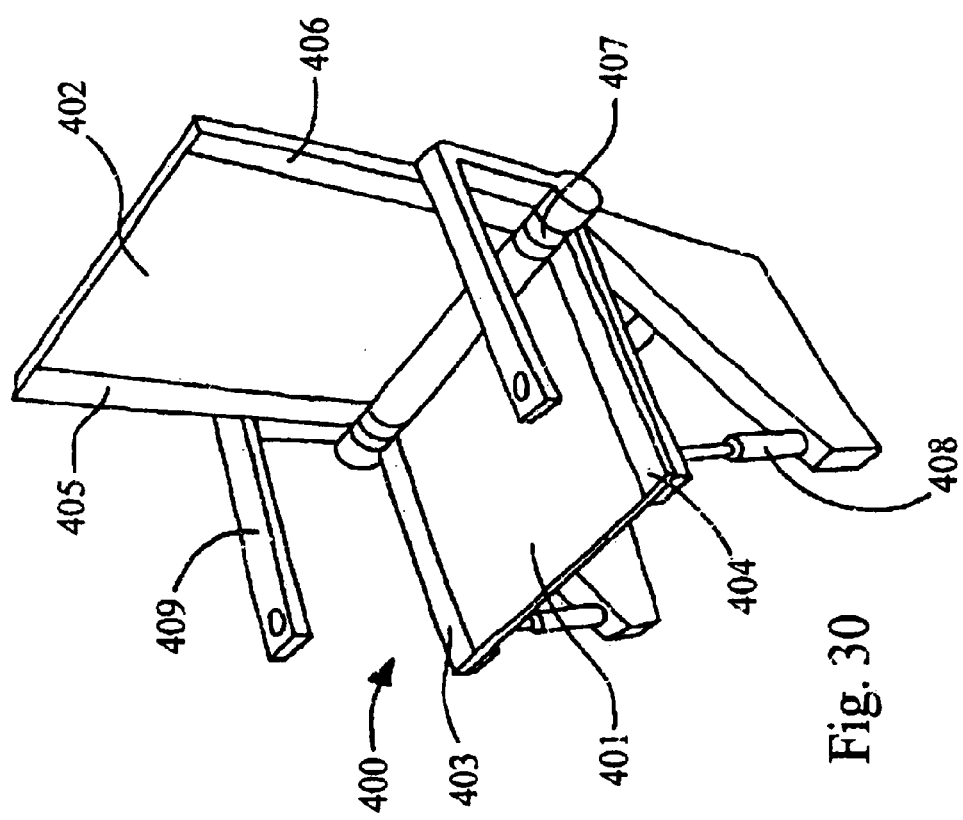

Referring now to FIGS. 30 and 31 a further embodiment of the invention is shown according to the second aspect. In this embodiment the seat elements 401, 402 are made in a single piece of appropriately resilient material which is arranged to flex about the central axis. FIG. 30 shows the seat in the rest position and comprises a seat part and a seat back part each of which are made from a single piece of resilient material which are supported along each side by rigid reinforcing strips 403, 404, 405, 406. In this embodiment the seat back and seat are pivotally connected to each other by means of a hinge 407. The seat 401 is supported at the front end of each of its reinforcing strips 403, 404 by resilient hydraulic or gas spring struts 408. Corresponding resilient means are provided for the seat back although not shown in the figures. The seat also comprises arm rests 409.

The corresponding spring struts 408 on either side of the seat are linked so that as on is compressed the other rises so they work together to accommodate the posture of the occupant. A control button 410 is provided on the arm 409 to permit the user to control the extent of movement and responsiveness of the seat. The user may wish to lock the seat in a desired position effectively disabling the twisting adjustment of the seat. This could be done with the seat in the rest position if the occupant did not wish to use this facility. Also it is possible for the user to control the degree of sensitivity of the responsiveness of the seat which may be useful for occupants of widely differing sizes and weights.

When the occupant moves in such a way that the occupant's weight distribution is varied, the seat moves accordingly. If the occupant moves to one side of the central axes 1, 11, the seat correspondingly moves about the central axis and accommodates the twisting movement of the occupant and provides support for the occupant in the new twisted position. In FIG. 31 the occupant (not shown) has adopted a twisted position facing sideways towards the viewer rather than straight forwards, a position that the occupant would typically adopt if he wished to talk to someone to his side or if he wished to look at something to the side. This twisted position is made comfortable by this twisting movement of the seat with one side of the seat lowered and the other side raised, either side of the central axis and one side of the seat back leaning backwards and the other side of the central axis leaning forwards. This corresponds to the body posture of the occupant in the turned position and provides additional support to more parts of the occupant's body in this turned position. This can be compared to a prior art seat which does not have any movement either side of the central axes 1, 11. When the occupant tries to adopt a turned position there is greater pressure on the one leg on the inside of the turn and no support on the remaining leg on the outside of the turn. Similarly there is greater pressure on the back, side and shoulder of the occupant on the side towards which the occupant has turned and no support for these parts of the occupants body on the opposite side. This leads to discomfort and also health problems if the unsupported position, and in particular the increased pressure is adopted for significant lengths of time as has been found to occur in long haul flights.

Additionally in FIGS. 30 and 31 it can be seen that the arm rests 409 can be arranged to move by an certain desired amount to correspond to the posture of the user in order to provide compensated support for the arms of the occupant. Similarly although not specifically depicted, head rest and foot rest parts can be configured in similar ways to those shown in respect of the seats and seat backs of the depicted embodiments so that these seat components also adjust to the posture of the occupant.

This embodiment shown in FIGS. 30 and 31 includes two separate sheets for the seat and seat back but it will be appreciated that it could be possible to provide an entire seat from a single piece of material made from a suitable composite material with strengthening elements to rigidize the seat to provide the support frame. Such a single sheet could be designed to stretch in more than one plane to provide a more flexible complete seat as well as a separate twisting seat and back rest.

Alternative embodiments using the principles disclosed will suggest themselves to those skilled in the art, and it is intended that such alternatives are included within the scope of the invention, the scope of the invention being limited only by the claims.

What is claimed is:

1. A seat or seat back comprising a support frame and at least first and second seat elements disposed along a central axis of the seat or seat back, said seat elements being arranged to resiliently move with respect to each other, said central axis running centrally through the seat or seat back parallel to the spine of the occupant in a normally seated position, each seat element having two parts, one on either side of the central axis, wherein the seat elements are arranged to move with respect to the central axis, such that when one of the parts of a seat element moves forward with respect to the central axis, the other part moves backwards with respect to the central axis.

2. A seat or seat back according to claim 1, wherein the seat elements are pivotally attached to the central axis, the two seat element parts being arranged one on either side of the central axis, such that when one part moves in a downward direction with respect to the central axis, the other part moves in an upward direction with respect to the central axis.

3. A seat or seat back according to claim 1 wherein the seat elements are subject to a restoring force urging them to return them to their rest positions such that the user is able to move in a twisting position and the seat back or seat will also twist with the twisting movement of the user and provide support in the newly adopted position of the user.

4. A seat or seat back according to claim 1 wherein the restoring force on the seat elements is provided by an elongate spring member movably fixed to each of the seat elements on either side of the central axis.

5. A seat or seat back according to claim 4 wherein said elongate spring member is fixed at one end to the seat frame.

6. A seat or seat back according to claim 1 wherein the seat elements are formed by separately formed seat parts each arranged on a central support member.

7. A seat or seat back according to claim 1 wherein the seat elements are made in a single piece by forming corrugations in a planar member.

8. A seat or seat back according to claim 1 wherein the seat elements are made in a single piece.

* * * * *